United States Patent Office 2,827,493
Patented Mar. 18, 1958

2,827,493

MANUFACTURE OF CUMENE HYDROPEROXIDE

Ermbrecht Rindtorff, Wanne-Eickel, and Karl Schmitt, Herne, Germany, assignors to Bergwerksgesellschaft Hibernia Aktiengesellschaft, Wanne-Eickel, Germany, a company of Germany No Drawing. Application April 11, 1952
Serial No. 281,908

Claims priority, application Germany October 31, 1951

19 Claims. (Cl. 260—610)

The present invention relates to improvements in the manufacture of cumene hydroperoxide.

The manufacture of cumene hydroperoxide from isopropyl benzene (cumene) is known. Thus dry molecular oxygen at 85° C. has been allowed to act on liquid cumene with simultaneous irradiation with a mercury vapour lamp, and after 25 hours about 7% of cumene hydroperoxide was obtained.

According to another known process, a small amount of an organic peroxide, e. g. benzoyl peroxide, acetyl peroxide or even cumene hydroperoxide is added to begin the reaction and this is necessary for activating and starting a reaction which is initially very slow. This reaction is carried out at a temperature between 80° C. and 150° C. Instead of the organic peroxide an inorganic peroxide, oxide or hydroxide can be used. The oxidation can also be carried out in aqueous alkali to which substances, such as sodium stearate, have been added in small amounts to improve emulsification. The emulsion is then heated to 120° C. and treated with molecular oxygen at 95° C.–200° C. and a pressure of 24 atmospheres. By this method 20–45% of the cumene can be converted into the hydroperoxide. To attain such a yield a working period of 45–55 hours is necessary. As has been found, the increase in hydroperoxide in the first hours after the induction period amounts to about 1% per hour, whilst after a concentration of hydroperoxide of about 35% is exceeded, the increase only amounts to 0.3–0.5%.

It has also already been proposed to manufacture cumene hydroperoxide by treating cumene with ozonized oxygen, preferably in the presence of a catalyst, at the customary temperature. The catalyst may be for example an organic or inorganic peroxide or hydroperoxide, or an inorganic oxide or hydroxide. In this case the process is so carried out that oxygen, which is ozonized for example to the extent of 5% is finely divided and led into the liquid cumene with intensive stirring at room temperature (about 20° C). In this method of working it was found that in addition to the formation of cumene hydroperoxide a series of by-products is produced. It is probably a question of homologues of benzene ozonide, acids, aldehydes, ketones, etc. disadvantageously affecting the yield of the process and in particular disturbing the eventual working-up of the cumene hydroperoxide.

It has now been found that in the treatment of cumene with ozonized oxygen the formation of the above-mentioned by-products is prevented, the yield thereby improved and the eventual working-up rendered considerably easier if (1) the process is carried out at an elevated temperature, preferably at a temperature of 40° C.–60° C., and (2) the addition of the ozone is not carried out continuously, but is undertaken at short intervals. The presence of a small amount of alkali, sufficient to neutralise any small amount of organic acid formed, helps to increase the yield of hydroperoxide.

The invention will be more clearly understood by reference to the following examples which are purely illustrative.

Example 1

Ozonized oxygen (5% ozone) was led in to cumene at uniform intervals of two hours for a duration of five minutes and in the intermediate period molecular oxygen was used. The temperature was maintained between 40° C. and 60° C. In all 45–50 litres of $O_2$ per hour were used per kilogram of cumene. At the same time there was added to the fresh cumene 0.2% of alkali in the form of 25% caustic soda lye. Any small amounts of organic acids formed were thereby immediately neutralised, and thus could not act on the hydroperoxide to decompose it. This method of working has proved particularly favourable. The formation of hydroperoxide proceeded uniformly up to a concentration of about 40%, and only then was there a perceptible falling off of the absorbed oxygen. There was almost no formation of by-products. The specific yield, i. e. the increase of hydroperoxide per hour, was good and amounted on an average to about 2.0%–2.5% per hour, to decrease slowly after attaining higher concentrations. The conversion of cumene to cumene hydroperoxide per unit of time is twice as great as with known processes. After 20 hours of treatment a mixture is obtained which is 49 parts cumene and 51 parts cumene hydroperoxide.

Example 2

60 litres of oxygen per hour were passed through 500 g. of cumene, to which 0.2% alkali was added in the form of a 25% soda lye, at a temperature of about 60° C. with considerable stirring. After the first ten minutes the oxygen was ozonized by coupling an ozonizer for five minutes until the oxygen was 2% ozonized. This process of ozonization was repeated every two hours. After about 20 hours a mixture of 49 parts of cumene and 51 parts of cumene hydroperoxide was obtained. After this concentration of hydroperoxide was reached, fresh cumene, with 0.2% alkali, was added and a corresponding amount of the reaction mixture drawn off, so that the drawn-off reaction mixture contained about 35 parts of cumene hydroperoxide. In this way, about 100 grams of cumene solution containing 35% hydroperoxide was obtained per hour.

We claim:

1. Process for the manufacture of cumene hydroperoxide which comprises intermittently treating cumene with ozonized oxygen, the oxygen being at most 5% ozonized, at an elevated temperature and treating with oxygen in the intervals between ozonization.

2. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected at a temperature between 40° C. and 60° C.

3. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected in the presence of a catalyst.

4. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected at a temperature between 40° C. and 60° C. and in the presence of a catalyst.

5. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected in the presence of alkali.

6. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected at a temperature between 40° C. and 60° C. and in the presence of alkali.

7. Process for the manufacture of cumene hydroperoxide which comprises intermittently treating cumene with ozonized oxygen, the oxygen being at most 5% ozonized, at an elevated temperature and treating with oxygen in the intervals between ozonization, the treatment being effected at a temperature between 40° C. and 60° C. and in the presence of alkali and a catalyst.

8. Process for the manufacture of cumene hydroperoxide which comprises treating the cumene with ozonized oxygen, the oxygen being at most 5% ozonized, at an elevated temperature at uniform intervals of two hours for a duration of five minutes and treating with molecular oxygen in the intervals between ozonization.

9. Process for the manufacture of cumene hydroperoxide which comprises treating cumene with ozonized oxygen, the oxygen being at most 5% ozonized, at uniform intervals of two hours for a duration of five minutes and treating with molecular oxygen in the intervals between ozonization, the treatment being effected at a temperature between 40° C. and 60° C.

10. Process for the manufacture of cumene hydroperoxide which comprises treating the cumene with ozonized oxygen, the oxygen being at most 5% ozonized, at an elevated temperature at uniform intervals of two hours for a duration of five minutes and treating with molecular oxygen in the intervals between ozonization, the treatment being effected in the presence of a catalyst.

11. Process for the manufacture of cumene hydroperoxide which comprises treating the cumene with ozonized oxygen, the oxygen being at most 5% ozonized, at an elevated temperature at uniform intervals of two hours for a duration of five minutes and treating with molecular oxygen in the intervals between ozonization, the treatment being effected in the presence of alkali.

12. Process for the manufacture of cumene hydroperoxide which comprises treating cumene with ozonized oxygen, the oxygen being at most 5% ozonized, at uniform intervals of two hours for a duration of five minutes and treating with molecular oxygen in the intervals between ozonization, the treatment being effected at a temperature between 40° C. and 60° C. and in the presence of a catalyst.

13. Process for the manufacture of cumene hydroperoxide which comprises treating cumene with ozonized oxygen, the oxygen being at most 5% ozonized, at uniform intervals of two hours for a duration of five minutes and treating with molecular oxygen in the intervals between ozonization, the treatment being effected at a temperature between 40° C. and 60° C. and in the presence of alkali.

14. Process for the manufacture of cumene hydroperoxide which comprises treating cumene with ozonized oxygen, the oxygen being at most 5% ozonized, at uniform intervals of two hours for a duration of five minutes and treating with molecular oxygen in the intervals between ozonization, the treatment being effected at a temperature between 40° C. and 60° C. and in the presence of alkali and a catalyst.

15. Process for the manufacture of cumene hydroperoxide which comprises intermittently treating cumene with ozonized oxygen at an elevated temperature and treating with oxygen in the intervals between ozonization, the oxygen being 5% ozonized.

16. Process for the manufacture of cumene hydroperoxide which comprises intermittently treating cumene with ozonized oxygen at an elevated temperature and treating with oxygen in the intervals between ozonization, the oxygen being 5% ozonized and the treatment being effected at a temperature between 40° C. and 60° C.

17. Process for the manufacture of cumene hydroperoxide which comprises intermittently treating cumene with ozonized oxygen at an elevated temperature and treating with oxygen in the intervals between ozonization, the oxygen being 5% ozonized and the treatment being effected in the presence of a catalyst.

18. Process for the manufacture of cumene hydroperoxide which comprises intermittently treating cumene with ozonized oxygen at an elevated temperature and treating with oxygen in the intervals between ozonization, the oxygen being 5% ozonized and the treatment being effected at a temperature between 40° C. and 60° C. and in the presence of alkali.

19. Process for the manufacture of cumene hydroperoxide which comprises treating cumene with ozonized oxygen at uniform intervals of two hours for a duration of five minutes and treating with molecular oxygen in the intervals between ozonization, the oxygen being 5% ozonized and the treatment being effected at a temperature between 40° C. and 60° C. and in the presence of alkali and a catalyst.

References Cited in the file of this patent

UNITED STATES PATENTS

| 2,632,772 | Armstrong et al. | Mar. 24, 1953 |

FOREIGN PATENTS

| 630,286 | Great Britain | Oct. 10, 1949 |